United States Patent [19]

Cone

[11] 3,997,310
[45] Dec. 14, 1976

[54] METHOD AND APPARATUS FOR FORMING GLASS BEADS

[75] Inventor: Eugene J. Cone, Cheswick, Pa.
[73] Assignee: PPG Industries, Inc., Pittsburgh, Pa.
[22] Filed: Sept. 2, 1975
[21] Appl. No.: 609,646
[52] U.S. Cl. .................................. 65/21; 65/116; 65/142; 264/3 C; 264/3 E
[51] Int. Cl.² ......................................... C03B 19/10
[58] Field of Search ...................... 65/21, 116, 142; 264/3 C, 3 E; 29/1.22

[56] References Cited
UNITED STATES PATENTS

| | | | |
|---|---|---|---|
| 3,361,549 | 1/1968 | Nakajima | 65/21 |
| 3,422,988 | 5/1969 | Williams | 65/21 X |
| 3,843,340 | 10/1974 | Cone | 65/21 |
| 3,877,960 | 4/1975 | Knoss | 65/21 X |

Primary Examiner—Robert L. Lindsay, Jr.
Attorney, Agent, or Firm—Dennis G. Millman

[57] ABSTRACT

Glass beads are formed with a high rate of production by jetting an array of molten glass streams arranged around a central zone. The beads which are formed are caught in a quench bath, where they are immediately dispersed by a high-velocity radial stream of fluid from a nozzle located within the central zone. A secondary, low-velocity fluid stream is provided in the quenching bath to prevent localized over-heating.

10 Claims, 3 Drawing Figures

METHOD AND APPARATUS FOR FORMING GLASS BEADS

BACKGROUND OF THE INVENTION

This invention relates to an improvement in the process for producing glass beads described in U.S. Pat. No. 3,843,340 to Eugene J. Cone, entitled "Method and Apparatus for Producing Glass Beads." In that process, glass is melted to a low viscosity and forced through a small-diameter orifice to form a jet which breaks apart into beads as it falls through air. The single jet of glass shown in that patent, however, is greatly limited as to its production rate. It would therefore be desirable to employ a plurality of bead-forming jets on the same melter, thereby improving efficiency and rendering large-scale production more practical. But merely increasing the number of jets gives rise to a number of problems. Because the beads are caught in a quenching fluid while still in a softened condition so as to reduce the drop height to a more manageable distance, increasing the rate of bead formation results in a higher incidence of collisions between the soft beads in the quenching bath, which can cause the beads to be deformed or become adhered together. Also, intensifying the influx of hot beads into a quenching bath can overload the ability of the fluid to dissipate the heat, leading to localized overheating which in turn can cause inclusions of quenching fluid residues within the beads as well as causing loss of fluid by evaporation and ignition.

SUMMARY OF THE INVENTION

The present invention permits a high rate of glass bead production while avoiding bead collisions and quench bath overheating. A large throughput is achieved by providing an array of jet-forming orifices spaced from a central area, such as in a ring configuration. As the beads fall into the quench bath they are quickly translated outwardly from the center of the array pattern, away from each other, by a high velocity stream of fluid directed transversely across the path of each stream of falling beads from the center of the array. Each bead is thus abruptly whisked aside, free and clear of the next bead about to plunge into the quench bath, and the beads become distributed across a wider portion of the quench bath. A second stream of fluid, lower in velocity but greater in volume, also sweeps across the zone where the beads enter the quench bath to assure an adequate replenishment of cooler quench fluid in that zone.

THE DRAWINGS

DETAILED DESCRIPTION

Figure 1:
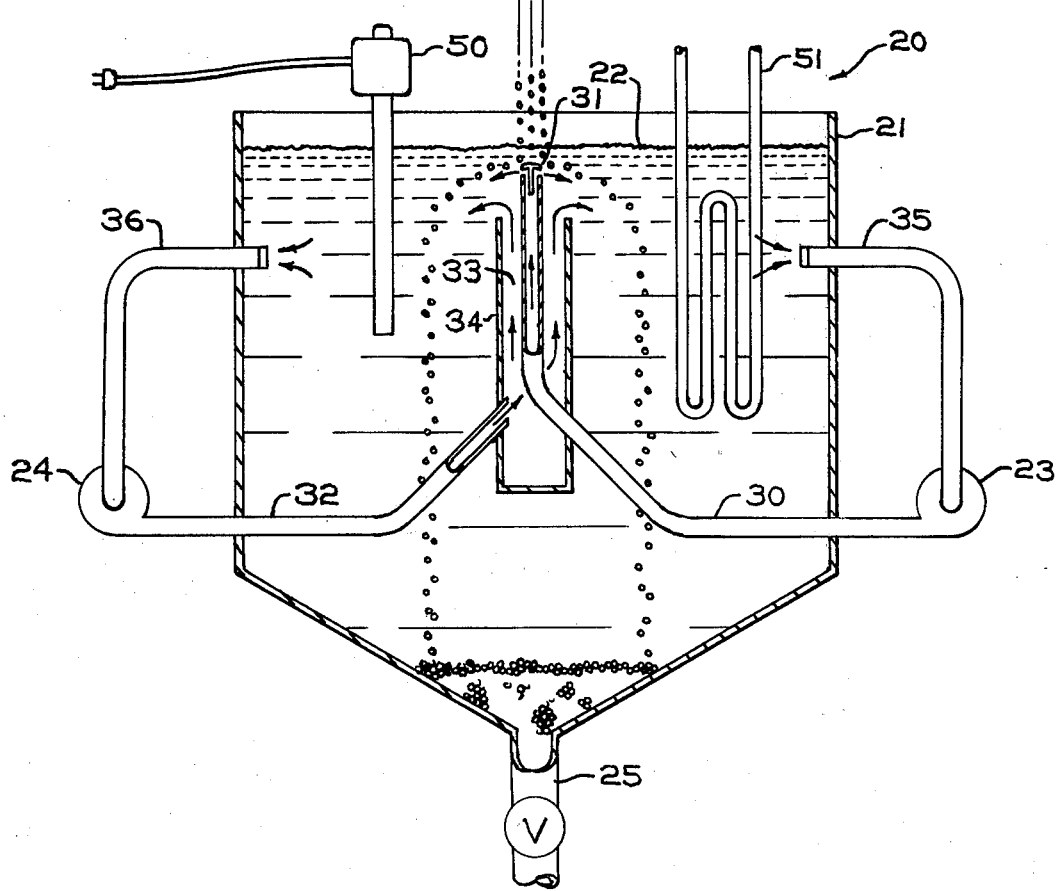
FIG. 1 is a cross-sectional view of a glass melting furnace with bead forming means and a circulating liquid quenching bath of a preferred design.

In FIG. 1 there is shown an overall glass bead-making operation in which glass is melted in a furnace 10 and force through orifices in a neck 11 to form a plurality of jets 12. The jets dissociate into beads solely due to flow irregularities and surface tension, and the beads are caught in a quenching bath 20. Details of suitable melting and bead-forming operations can be found in U.S. Pat. No. 3,843,340 to Eugene J. Cone, the disclose of which is hereby incorporated by reference. Other structural details of the furnace 10 and neck 11 are disclosed in U.S. Pat. application Ser. No. 488,116, filed July 21, 1974, by Richard A. Caripolti, now abandoned the disclosure of which is also incorporated by reference. Other specific furnace designs will lend themselves to use with the present invention, therefore the furnace 10 and neck 11 are shown somewhat schematically in the drawings here. Only three representative jets of glass 12 are shown in the drawings, but it should be apparent that a larger or smaller number could be employed. In the preferred embodiment, ten or more jets are employed and are arranged in a circle. The circular array is the simplest and most aesthetically pleasing, but any patterned or random array which leaves a central area open would be suitable so long as there is some angular displacement between adjacent jets with respect to a point in the center of the array. This permits the beads to be dispersed outwardly from the center of the array without causing collisions when they enter the quench bath, and at the same time makes efficient use of the limited area on the bottom of neck 11 across which the orifices may be located.

The glass jets fall a distance of a few meters or less to a quench bath 20, and at some intermediate point along this distance the jets break apart into beads because of flow instabilities and surface tension. The bath 20 includes a tank 21 holding a quantity of quenching fluid 22 and pumps 23 and 24 for circulating the quenching fluid. The beads fall to the bottom of tank 21 where they accumulate and are periodically discharged through a valved bottom outlet 25. The quenching fluid is preferably a liquid such as an oil from the class known as quenching oils, which are generally characterized by relatively low flash points, resistance to decomposition at high temperatures, ease of pumping, and lack of solvent or chemical action on the articles being treated. A specific paraffinic quenching oil with which the invention has been successfully practiced is commercially available as "Gulf 412 Martempering Oil" from the Gulf Oil Corporation, which has the following properties:

| | |
|---|---|
| Gravity, ° API | 26.4 |
| Viscosity, poises | |
| at 100° F. (38° C.) | 5.1 |
| at 210° F. (99° C.) | 0.24 |
| Viscosity Index | 96 |
| Flash, OC | 600° F. (315° C.) |
| Fire, OC | 680° F. (360° C.) |
| Pour point | 0° F. (−18° C.) |
| Neutralization Value, ASTM D-974, | |
| Total Acid No. | 0.03 |

Figure 2:
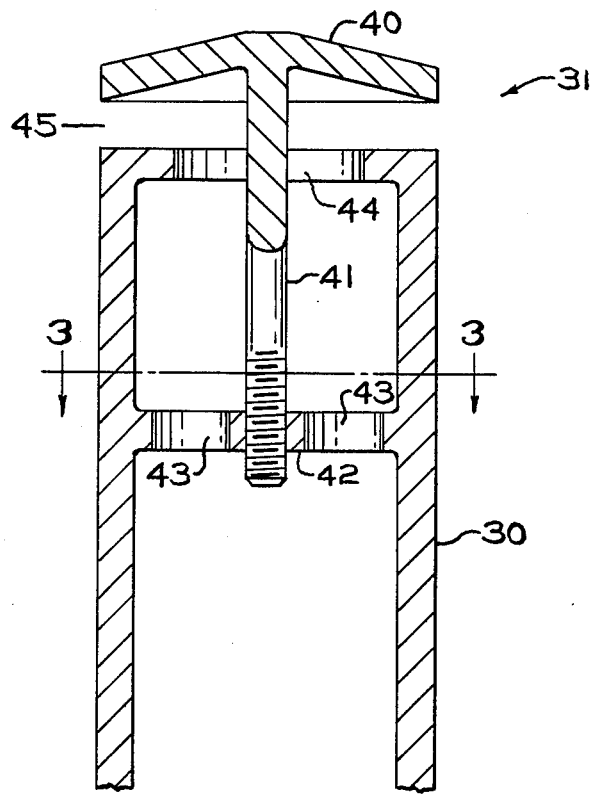
FIG. 2 is an enlarged cross-sectional view of a liquid spray head employed in the quenching bath of FIG. 2.
Figure 3:
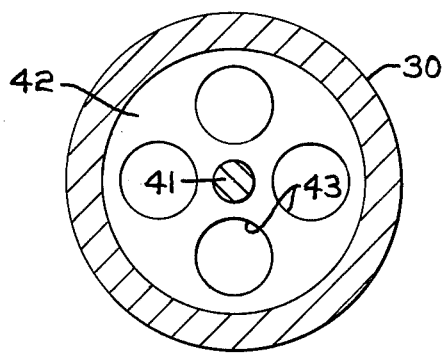
FIG. 3 is a horizontal section taken along lines 3-3 in FIG. 2, showing details of the spray head.

In the specific embodiment shown in FIG. 1, a fluid input line 30 supplies submerged, high velocity, radial flow nozzle 31, while another line 32 supplies a large-volume, annular passage 33 defined by a sheath 34. The fluid is recirculated via return lines 35 and 36. Details of nozzle 31 may be seen in FIGS. 2 and 3. Cap 40 is fitted over the open upper end of pipe 30 by means of a threaded stem 41 which screws into a cross member 42. The quenching fluid passes upwardly through bores 43 in cross member 42, through opening 44 at the top of pipe 30, and then radially outward through a space 45 between cap 40 and the top of pipe 30. Alternatively, cap 40 may be omitted, in which case the fluid will simply flow upward and outward fountain style from opening 44. The quenching bath is provided with heating means, such as electric heater 50, and cooling means, such as water pipe 51, for controlling the temperature of the quenching liquid and thereby selecting a suitable viscosity and heat transfer coefficient, the advantages for which are disclosed in U.S. Pat. Application Ser. No. 609,631, filed on even date herewith by Joseph J. Hammel and Eugene J. Cone, entitled "Glass Bead Forming Method".

Nozzle 31 is located within, and at the approximate center of, the array of falling bead streams so as to set up a flow pattern which is directed radially outward from the center so that a portion of its flow transversely intersects each stream of beads and carries the beads outwardly from the center of the array. The restricted opening 45 creates a well defined radial flow, the velocity of which, by adjusting the width of the opening 45, can be varied from very high to moderate. For lower velocities, cap 40 may be dispensed with, in which case the fluid will rise from the submerged upper end of pipe 30 a short distance and spread out radially near the surface of the body of fluid in the bath. Although higher velocities may be more effective in removing the beads from the initial impact zone, extremely high velocities can lead to deformed beads and thus should be avoided. With or without cap 40, it is preferred to locate the upper end of pipe 30 at or slightly below the surface of the main body of fluid (for example, on the order of 0 to about 15 centimeters).

The top of sheath 34 presents a larger annular opening through which a second stream of fluid, slower in velocity but generally having a greater volume flow rate, may be pumped. This annular stream is directed in a general, upward direction toward the region of the quench bath adjacent radial nozzle 31, where heating of the fluid by transfer of heat from the beads is most intense. The flow pattern of the annular stream may be generally parallel, radially and horizontally, and complimentary to the high velocity radial stream, but its function is primarily one of mass circulation, and it need not be particularly directional. As a result, the top of sheath 34 is preferably located considerably further below the surface of the fluid than is nozzle 31 (for example, on the order of about 15 to about 45 centimeters).

Specific velocities and flow rates for both quench fluid streams depend upon a large number of parameters such as: glass composition, temperature in the glass melter, the distance the beads fall, the size of the beads, the particular fluid used in the quenching bath, and quenching bath temperature. The following specific example will be illustrative.

EXAMPLE

Beads having an average diameter of 5 millimeters were formed from a glass consisting essentially of the following approximate composition by weight on the oxide basis:

| | |
|---|---|
| $SiO_2$ | 40% |
| $B_2O_3$ | 50.5% |
| $Na_2O$ | 9.5% |

Such a composition is disclosed in U.S. Pat. Application Ser. No. 447,199, filed Mar. 1, 1974, by Joseph J. Hammel and Ties Allersma, U.S. Pat. No. 3,923,533, the disclosure of which is hereby incorporated by reference. This composition is adapted for subsequent phase separation and leaching to form high silica, microporous beads suitable for use as catalyst supports. The temperature at the neck of the melter was about 1250° C., and the drop height was about 5 feet (about 2 meters). The quenching fluid was the Gulf 412 quenching oil described above, and the quench bath was maintined at about 55° C. The beads were produced with an arrangement substantially as shown in the drawings, wherein ten jets of glass arranged in a circle produced about 40 pounds (18 kilograms) of beads per hour. Opening 44 at the top of pipe 30 was one inch (2.54 centimeters) in diameter, and sheath 34 had an inside diameter of 3.9 inch (10 centimeters). Under these conditions, flow rates of about 5 to about 20 gallons per minute (19 to 76 liters/min) were found suitable for radial flow nozzle 31 as opening 45 was varied from one-eighth inch (0.32 centimeters) to one-half inch (0.127 centimeters), respectively. Flow through the annulus 33 was adequate in the range of about 15 to about 35 gallons per minute (56 to 132 liters per minute).

It is to be understood that other modifications and variations as are known to those of skill in the art may be resorted to without departing from the spirit and scope of the invention as defined by the appended claims.

I claim:
1. A method of producing glass beads comprising the steps of:
   a. forming molten glass into a stream of falling beads;
   b. catching said beads in a bath of quenching fluid while said beads are in a heated, softened state;
   c. imparting sufficient acceleration to said beads in a direction transverse to the direction with which they enter the bath by means of a first fluid stream closely adjacent to the region of the bath into which the beads fall, so as to substantially prevent collisions between beads; and
   d. enhancing fluid circulation around said region in which the beads enter the bath by means of a second fluid stream so as to avoid overheating the quenching fluid by heat transfer from the beads.

2. The method of claim 1 wherein a plurality of streams of beads are provided which fall in an array around a central zone, and said first fluid stream emanates radially from a nozzle located within said central zone.

3. The method of claim 2 wherein said second fluid stream emanates from an annular opening centered around said nozzle.

4. The method of claim 1 wherein said quenching fluid is a quenching oil.

5. A method of producing glass beads, comprising the steps of:
   a. forming molten glass into a plurality of streams of beads falling in an array around a central zone;
   b. catching said beads in a bath of quenching fluid while said beads are in a softened state;
   c. dispersing said beads outwardly, away from said central zone by means of a stream of fluid directed radially outward from said central zone closely adjacent the region of the bath into which the beads fall, so as to substantially prevent collisions between beads.

6. The method of claim 5 wherein said quenching fluid is a quenching oil.

7. An apparatus for producing glass beads comprising:
   a glass melting vessel having an orifice through which molten glass may be projected to form glass beads;
   a quenching bath beneath said melting vessel for catching the beads as they fall;
   first fluid flow means including a nozzle in said quenching bath oriented to direct a first fluid stream transversely across the path of the falling beads; and
   second fluid flow means including an outlet for a second fluid stream in said quench bath oriented to induce generalized fluid circulation in the region around said first fluid stream.

8. An apparatus for producing glass beads comprising:
   a. a glass melting vessel having a plurality of glass bead forming orifices in the bottom, said orifices arranged in an array around a central area;
   b. a quenching bath beneath said melting vessel for catching the beads as they fall;
   c. fluid flow means, including a nozzle located in said quench bath directly below said central area and having a fluid outlet oriented for directing a flow of fluid transversely across the path of each stream of beads being caught in the quenching bath so as to disperse the beads radially outwardly from the center of the array pattern.

9. The apparatus of claim 8 further comprising a second fluid flow means which includes an outlet for a second fluid flow in said quench bath oriented to induce generalized fluid circulation in the region around said transverse fluid flow.

10. The apparatus of claim 9 wherein said outlet for the second fluid flow is an annular opening centered around said nozzle.

* * * * *